United States Patent [19]

von Seyerl

[11] Patent Number: 4,508,638

[45] Date of Patent: Apr. 2, 1985

[54] AGENT AND METHOD FOR THE STABILIZATION OF POLYVINYL CHLORIDE AGAINST HEAT AND LIGHT

[75] Inventor: Joachim von Seyerl, Seeon, Fed. Rep. of Germany

[73] Assignee: SKW Trostberg Aktiengesellschaft, Trostberg, Fed. Rep. of Germany

[21] Appl. No.: 480,175

[22] Filed: Mar. 29, 1983

[30] Foreign Application Priority Data

Apr. 2, 1982 [DE] Fed. Rep. of Germany ....... 3212336

[51] Int. Cl.$^3$ .............................................. C09K 15/16
[52] U.S. Cl. ..................................... 252/401; 524/195
[58] Field of Search ................. 524/195; 252/392, 401

[56] References Cited

U.S. PATENT DOCUMENTS 3,975,357  8/1976  Murayama et al. ................... 524/99
4,009,137  2/1977  Dany et al. ......................... 524/195
4,182,698  1/1980  Ellis .................................... 524/195

Primary Examiner—Christine M. Nucker
Attorney, Agent, or Firm—Felfe & Lynch

[57] ABSTRACT

An agent on the basis of dicyandiamide for the stabilization of polyvinyl chloride against heat and light is described, which has an additional content of 0.5 to 7 equivalents of water and/or compounds containing water and/or compounds yielding water by cleavage, with respect to the amount of dicyandiamide.

5 Claims, No Drawings

AGENT AND METHOD FOR THE STABILIZATION OF POLYVINYL CHLORIDE AGAINST HEAT AND LIGHT

The present invention relates to an agent and method for the stabilization of polyvinyl chloride against heat and light, on the basis of dicyandiamide.

The use of dicyandiamide for the stabilization of polyvinyl chloride against heat and light is known and has proven effective in many applications. The disadvantage of this stabilizer, which melts around 210° C., is its poor miscibility in the plastic PVC (even in the presence of plasticizers), and the unequal distribution of the dicyandiamide in the plastic which this entails. This results in poor initial stabilization, which expresses itself in a yellow discoloration.

These difficulties can be avoided only partially by the use of a melt mixture whose melting point is below the fabrication temperature of the polyvinyl chloride. Such a melt mixture can consist, for example, of aminobenzenesulfonic acid amide and dicyandiamide in accordance with DD Pat. No. 28,349, but yellow discoloration cannot be avoided in this manner.

Dicyandiamide is also used together with other stabilizers, such as for example pentaerythritol or dipentaerythritol, in the manufacture of asbestos-filled floor coverings (cf. GB No. 985,405), or with triazine compounds such as melamine, alkylmelamines, phenylmelamine or benzoguanamine in accordance with U.S. Pat. No. 3,194,786.

For the stabilization of soft PVC films, it is also known to use mixtures on the basis of dicyandiamide with bariumcadmium salts of organic acids (DD No. 134,235), sulfanilamide (DD No. 33,169) as well as lead compounds and benzolazine or phenylene diisocyanate as additives. Also used are aminocrotonic acid esters in mixture with dicyandiamide (DD No. 140,464).

The disadvantage of all these known stabilizer mixtures consists in the fact that the thermal stability of the manufactured PVC products is limited, and at temperatures above 150° C., i.e., at the usual fabricating temperatures, the thermal stability diminishes very greatly, causing considerable discoloration in the PVC products.

It was therefore the aim of the present invention to improve the stabilization against heat and light of polyvinyl chloride formulations which contain the other raw materials typically used in fabrication, without altering the other useful technical properties.

This aim is achieved in accordance with the invention by using dicyandiamide with a content of 0.5 to 7 equivalents of water and/or compounds containing water and/or compounds yielding water by cleavage, with respect to the amount of dicyandiamide. In other words, 0.5 to 7 moles of water are added as such or in releasable form.

It has surprisingly been found that the action of dicyandiamide with regard to the liability of PVC to discolor under exposure to heat can be improved by the addition of water and/or water-containing compounds and/or compounds yielding water by cleavage, both as regards the initial stability and inherent color of the PVC products, and as regards the duration of the stabilization, without altering other valuable technical working properties. This was not foreseeable on account of the mere fact that undesirable bubbling, and the porosity of the PVC which bubbling entails, had to be expected. The additives of the invention are distinguished by good compatibility, even with the other stabilizers or other possible additives, such as fillers, plasticizers, dyes and pigments, adhesivizers or lubricants.

The addition of water and/or compounds yielding water by cleavage and/or compounds containing water can be made to any of the known stabilizer mixtures containing dicyandiamide or to dicyandiamide alone.

The stabilizers of the invention are suitable for all kinds of PVC products, such as powders, boards, films, extruded shapes, tubes, etc., and for both soft and hard PVC products. The fillers can be conventional fibrous substances such as asbestos and mineral wool or other additive materials, especially inorganic compounds such as $CaCO_3$, $CaSO_4$, $BaSO_4$, $SiO_2$, calcium silicate, kaolin, china clay, magnesium silicate or pigments such as $TiO_2$, $Fe_2O_3$, and $PbCrO_4$.

Suitable water-containing substances are any of the inorganic salts containing water of crystallization, as long as they are colorless or have little color of their own and do not destabilize PVC. Examples are: $ZnSO_4.7H_2O$, $Na_2SO_3.7H_2O$, $CaSO_4.2H_2O$, $K_2CO_3/Na_2CO_3.6H_2O$, $K_2Mg(SO_4)_2.6H_2O$, $Na_2B_4O_6.10H_2O$, $Na_3PO_4.12H_2O$, $Na_2S_2O_3.2H_2O$, $KAl(SO_4)_2.12H_2O$, especially $FeSO_4.7H_2O$ or $NiSO_4.6H_2O$. Substances yielding water by cleavage can be, for example, any of the metal hydroxides, aluminum hydroxide and magnesium hydroxide having proven especially advantageous, or superbasic metal carboxylates such as calcium stearate.calcium hydroxide, for example. Also usable are univalent metal hydroxides capable of yielding intermolecular water or of reacting with evolving HCl to form water and chloride. The substances which contain water and/or substances yielding water by cleavage can be added in finely ground form, together with the dicyandiamide and other additives, to the PVC powder before these components are intensively mixed together, the grain size being best between 1 micron and 75 microns, and amounting preferably to from 2 to 20 microns, or they are admixed with the stabilizer mixtures containing dicyandiamide. Then the PVC compositions can be fabricated by the usual methods.

The important advantage of this stabilizing agent is the improved thermal stability up to temperatures of 200° C., making it possible to perform more rapidly and easily such thermal fabricating processes as calandering or gelling.

The following examples are intended to explain the invention more fully, without restricting it to them. Parts are parts by weight.

EXAMPLE 1

A mixture of 100 parts of PVC H 70 DF, 30 parts of phthalic acid ester (Palatinol$^R$), 1 part of wax (ground mixture) and 1 part of dicyandiamide as stabilizer is intimately mixed with 1 part of water and pressed at 175° C. to a film. The film thus obtained is characterized by substantially less initial inherent color than a film made in the same manner but without the addition of water.

EXAMPLE 2

A mixture of 100 parts of PVC H 70 DF, 30 parts of phthalic acid ester (Palatinol$^R$), 1 part of wax and 2 parts of stabilizers consisting of dicyandiamide and $ZnSO_4.7H_2O$ in a ratio of 1:1, is intimately mixed and pressed at 175° C. to a film. The film is distinguished by good transparency and light inherent color. When baked at 175° C., not until after 45 minutes does a slight brownish color develop. A film prepared for comparison without the addition of $ZnSO_4.7H_2O$ is cloudy and turns brown after 40 minutes.

EXAMPLE 3

A ground mixture in accordance with Example 1 is thoroughly mixed with stabilizer consisting of 1 part of dicyandiamide and 0.3 parts of $FeSO_4.7H_2O$ and pressed to a film at 175° C.

The film has a slight yellowish color which nevertheless does not change with exposure to heat at 175° C. for 60 minutes. The film made for comparison without the addition of $FeSO_3.7H_2O$ is blackish brown after 60 minutes.

EXAMPLE 4

A ground mixture in accordance with Example 1 is thoroughly mixed with 1% by weight of a stabilizer consisting of one part of dicyandiamide and one part of $NiSO_4.7H_2O$, and pressed to a film at 175° C.

The film has a slightly yellowish color which nevertheless does not change with exposure to heat at 175° C. for 60 minutes.

EXAMPLE 5

Comparably good results on a PVC film of low inherent coloration are obtained by the addition of a stabilizer mixture consisting of calcium stearate, $FeSO_3.7H_2O$, and dicyandiamide in a ratio of 1:1:1.

EXAMPLE 6

A mixture in accordance with Example 1 is mixed with one part each of dicyandiamide and $Ha_2SO_3.7H_2O$ and pressed to a film at 175° C. The film has a very faint inherent color. After 60 minutes of exposure to heat at 175° C. a slight yellowing is observed.

EXAMPLE 7

A clear film similarly prepared with a mixture of 1% of pentaerythritol, 1% of dicyandiamide and 0.5% of $Mg(OH)_2$ by weight shows a slight yellowing after 45 minutes of exposure to heat.

EXAMPLE 8

A mixture in accordance with Example 1 is mixed with 1% by weight each of dicyandiamide, sulfanilamide and $Na_2SO_3.7H_2O$ and pressed to a film at 175° C. The clear, transparent film yellows slightly after 60 minutes' exposure to heat at 175° C.

I claim:

1. An improved agent of the type containing dicyandiamide for stabilizing polyvinyl chloride against degradation by heat and light, wherein the improvement comprises water means to provide 0.5 to 7 equivalents of water based on the dicyandiamide and said water means is a compound capable of reacting with HCl to form water and chloride.

2. An improved agent of the type containing dicyandiamide for stabilizing polyvinyl chloride against degradation by heat and light, wherein the improvement comprises water means to provide 0.5 to 7 equivalents of water based on the dicyandiamide and said water means is a metal hydroxide compound yielding water by cleavage.

3. The agent of claim 2 wherein said metal hydroxide is aluminum hydroxide, magnesium hydroxide or a combination thereof.

4. An improved agent of the type containing dicyandiamide for stabilizing polyvinyl chloride against degradation by heat and light, wherein the improvement comprises water means to provide 0.5 to 7 equivalents of water based on the dicyandiamide and said water means is an inorganic salt containing water of crystallization.

5. The agent of claim 4 wherein said salt is $FeSO_4.7H_2O$; $ZnSO_4.7H_2O$; $NiSO_4.7H_2O$; $Na_2SO_3.7H_2O$.

* * * * *